(12) United States Patent
Miura et al.

(10) Patent No.: US 8,050,013 B2
(45) Date of Patent: Nov. 1, 2011

(54) CAPACITOR AND METHOD OF PRODUCING THE SAME

(75) Inventors: Teruhisa Miura, Kyoto (JP); Susumu Nishimoto, Nara (JP); Nario Kawakita, Kyoto (JP)

(73) Assignee: Panasonic Corporation, Osaka (JP)

( * ) Notice: Subject to any disclaimer, the term of this patent is extended or adjusted under 35 U.S.C. 154(b) by 565 days.

(21) Appl. No.: 12/168,403

(22) Filed: Jul. 7, 2008

(65) Prior Publication Data

US 2009/0015987 A1 Jan. 15, 2009

(30) Foreign Application Priority Data

| Jul. 9, 2007 | (JP) | 2007-179540 |
| Jul. 9, 2007 | (JP) | 2007-179541 |
| Jul. 9, 2007 | (JP) | 2007-179542 |
| Jul. 9, 2007 | (JP) | 2007-179543 |

(51) Int. Cl.
*H01G 9/00* (2006.01)
(52) U.S. Cl. ..................................... 361/502
(58) Field of Classification Search ............... 361/502
See application file for complete search history.

(56) References Cited

U.S. PATENT DOCUMENTS

| 5,450,279 | A | * | 9/1995 | Yoshida et al. | ............... 361/502 |
| 7,830,647 | B2 | * | 11/2010 | Miura et al. | ............... 361/518 |

FOREIGN PATENT DOCUMENTS

| JP | 05251271 A | * | 9/1993 |
| JP | 09-017698 |  | 1/1997 |
| WO | WO 2007069538 A1 | * | 6/2007 |

* cited by examiner

*Primary Examiner* — Eric Thomas
(74) *Attorney, Agent, or Firm* — Pearne & Gordon LLP

(57) ABSTRACT

A capacitor includes a first electrode, a second electrode, a separator placed between the first and second electrodes, and an electrolyte. The first electrode includes a first collector made of metal foil, a first electrode layer containing carbon formed on the surface of the first collector, and a first protector covering the cross section of the first collector. The second electrode includes a second collector made of metal foil, a second electrode layer containing carbon formed on the surface of the second collector, and a second protector covering the cross section of the second collector.

16 Claims, 13 Drawing Sheets

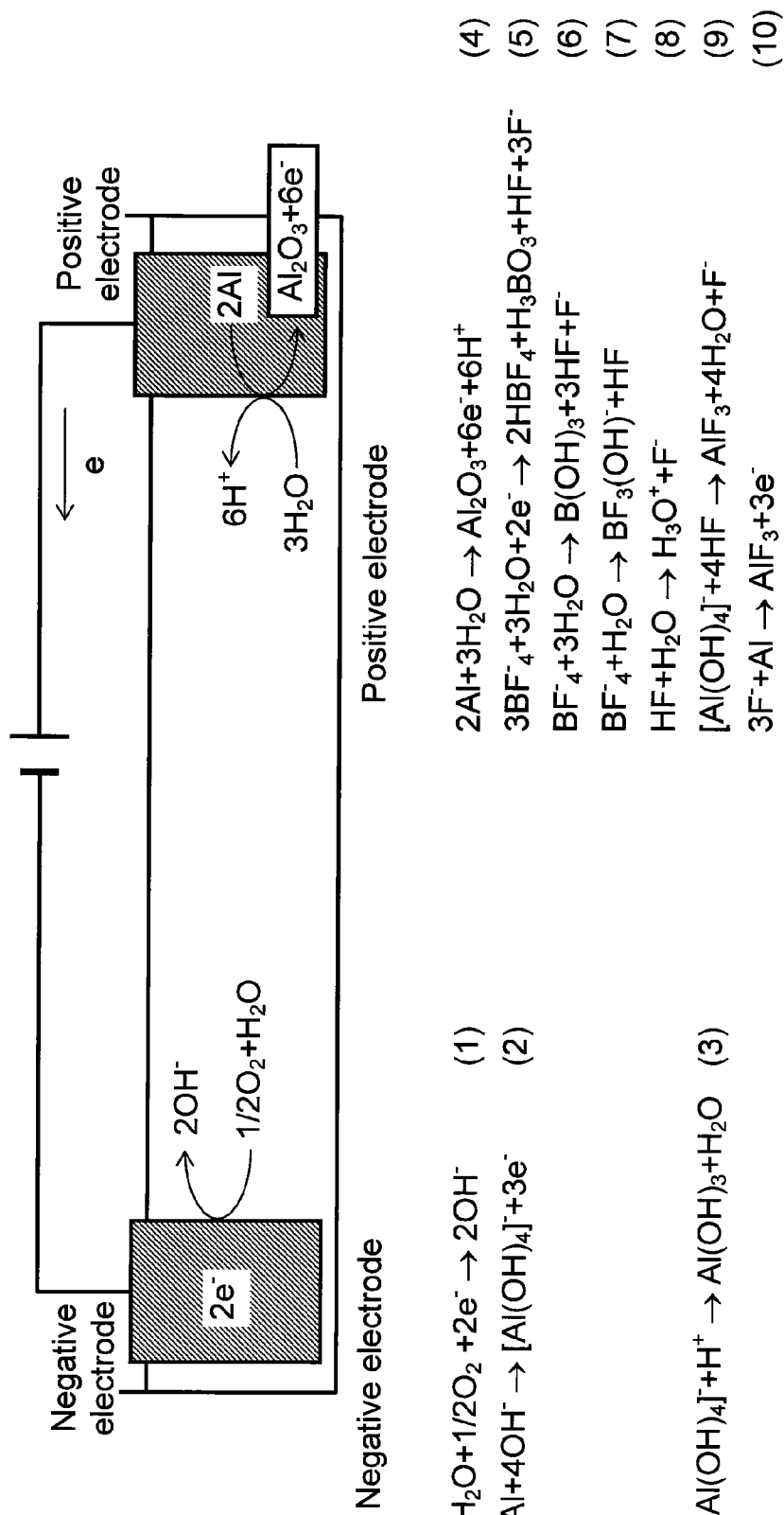

US 8,050,013 B2

CAPACITOR AND METHOD OF PRODUCING THE SAME

BACKGROUND OF THE INVENTION

1. Field of the Invention

The present invention relates particularly to a capacitor with high long-term reliability and its producing method among those used for various types of electronic devices, regeneration for a hybrid vehicle, storing power, and others.

2. Background Art

FIG. 13 is a partial cutaway perspective view illustrating the structure of an electric double layer capacitor as an example of a conventional capacitor. FIG. 14 is a sectional view of the substantial part of a capacitor element included in the capacitor shown in FIG. 13. The capacitor includes capacitor element 31, case 39, and sealing member 40.

Capacitor element 31 is formed of positive electrode 32 and negative electrode 33 wound with separator 34 placed therebetween. Positive electrode 32 and negative electrode 33 are structured by forming polarizable electrode layers 36 containing carbon on both sides of collector 35 made of aluminum foil. Positive electrode 32 and negative electrode 33 have leads 37, 38 connected thereto, respectively.

Capacitor element 31, after being impregnated with an electrolyte solution (not shown), is inserted into case 39. Case 39 made of metal is cylindrically shaped and has a bottom. Next, leads 37, 38 are inserted into holes provided in sealing member 40 made of rubber, respectively. In such a state, sealing member 40 is placed at the opening of case 39. After that, the outer circumference of the opening of case 39 is drawn inwardly, and the open end of case 39 is curled toward sealing member 40 to seal case 39. The electrolyte solution is prepared from mainly propylene carbonate (PC) used as the solvent with tetraethylammonium salt or the like as the solute.

However, when the above-described conventional capacitor is left in an open state between leads 37, 38 after being charged, the voltage gradually decreases due to a self-discharge phenomenon inherent in the capacitor. Such a voltage drop generally causes no problem at all. However, using the capacitor for starting an engine of a vehicle, for example, will cause a large trouble such as failing to start the engine due to the voltage drop.

SUMMARY OF THE INVENTION

A capacitor of the present invention includes first and second electrodes, a separator placed between the first and second electrodes, and an electrolyte solution. The first electrode includes a first collector made of metal foil, a first electrode layer containing carbon and formed on a surface of the first collector, and a first protector covering a cross section of the first collector. The second electrode includes a second collector made of metal foil, a second electrode layer containing carbon and formed on a surface of the second collector, and a second protector covering a cross section of the second collector.

BRIEF DESCRIPTION OF DRAWINGS

FIG. 3 is a schematic diagram of an estimated mechanism of a voltage drop caused by a self-discharge phenomenon in a conventional electric double layer capacitor.

DETAILED DESCRIPTION OF THE INVENTION

Hereinafter, a description is made for some exemplary embodiments of the present invention with reference to the related drawings. In each embodiment, a component with the same structure is given the same numeral as in the preceding embodiment and its detailed description may be omitted.

FIRST EXEMPLARY EMBODIMENT

Figure 1:
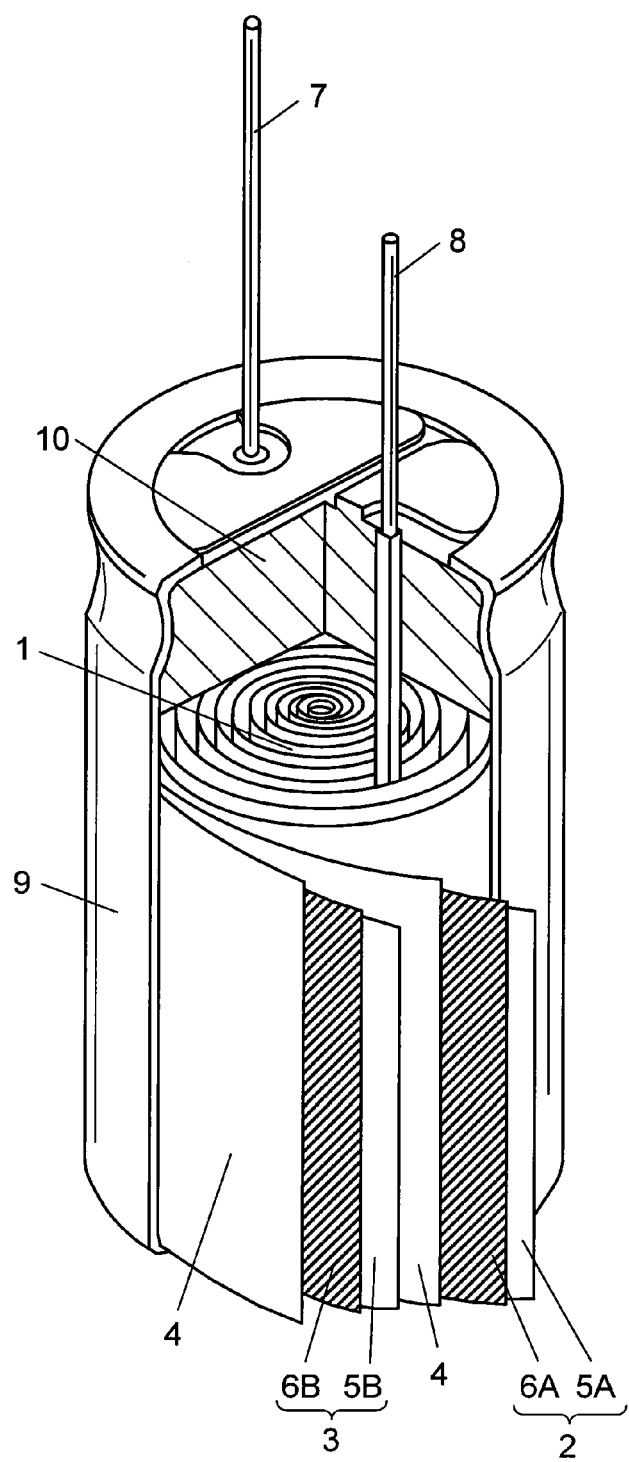
FIG. 1 is a partial cutaway perspective view of an electric double layer capacitor as an example of capacitor according to a first exemplary embodiment of the present invention.
Figure 2:
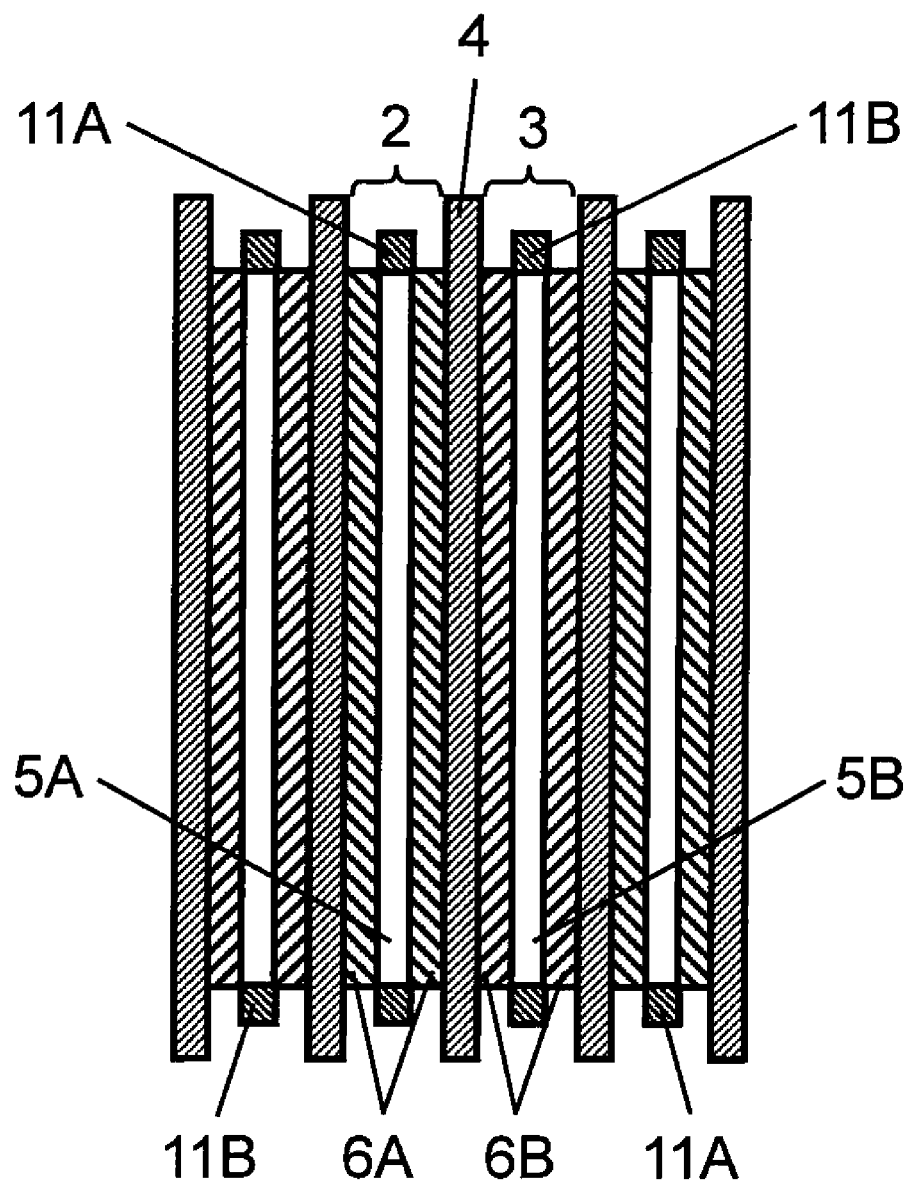
FIG. 2 is a sectional view of a capacitor element included in the electric double layer capacitor shown in FIG. 1.

FIG. 1 is a partial cutaway perspective view of an electric double layer capacitor as an example capacitor according to the first embodiment of the present invention. FIG. 2 is a sectional view of a capacitor element included in the electric double layer capacitor. The capacitor includes capacitor element 1, case 9, and sealing member 10.

Capacitor element 1 is formed by overlaying positive electrode 2 on negative electrode 3 with their positions aligned and by winding them with separator 4 placed therebetween. Positive electrode 2, a first electrode, is structured by forming polarizable electrode layers (first electrode layers) 6A containing carbon on both sides of collector (first collector) 5A made of aluminum foil, for example. In the same way, negative electrode 3, a second electrode, is structured by forming polarizable electrode layers (second electrode layers) 6B containing carbon on both sides of collector (second collector) 5B made of aluminum foil, for example. Positive electrode 2 and negative electrode 3 have leads 7, 8 connected thereto, respectively.

The end surface of collector 5A, which becomes an exposed part of the metal foil on the end surface of positive electrode 2, has protector (first protector) 11A formed thereon. In the same way, the end surface of collector 5B, which becomes an exposed part of the metal foil on the end surface of negative electrode 3, has protector (second protector) 11B formed thereon. That is, protectors 11A, 11B cover cross sections (cut surfaces) of collectors 5A, 5B, respectively. From a different viewpoint, protectors 11A, 11B are placed in gaps formed between portions of separator 4 mutually facing and projecting on both end surfaces of capacitor element 1, respectively.

After being impregnated with an electrolyte solution (not shown), capacitor element 1 is inserted into case 9. Case 9 made of metal is cylindrically shaped and has a bottom. Next, leads 7, 8 are inserted into holes provided in sealing member 10 made of rubber, respectively. In such a state, sealing member 10 is placed at the opening of case 9. After that, the outer circumference of the opening of case 9 is drawn inwardly, and the open end of case 9 is curled toward sealing member 10 to seal case 9. As the electrolyte solution, a solution prepared from mainly propylene carbonate (PC) as the solvent with tetraethylammonium salt or the like as the solute is used.

Before describing the effects and advantages owing to the above-described structure, a description is made for an estimated mechanism of a voltage drop caused by a self-discharge phenomenon in a conventional structure. FIG. 3 is a schematic diagram of an estimated mechanism of a voltage drop caused by a self-discharge phenomenon in a conventional electric double layer capacitor. In this example, the collectors of the positive and negative electrodes are made of aluminum and the electrolyte (solute) is tetraethylammonium tetrafluoroborate.

When the negative electrode is fed with electrons through charging, the electrons act on the interface between the negative electrode and the electrolyte solution in the presence of a slight amount of water and oxygen to produce hydroxide ions as shown in formula (1). When aluminum is used for metal foil of the collector, the aluminum reacts with the hydroxide ions produced in formula (1) as shown in formula (2) to produce aluminate ions. Although aluminum hydroxide appears to be produced at this moment, the alkaline atmosphere in the liquid indicates that mainly aluminate ions rather than aluminum hydroxide appear to be produced owing to the presence of hydroxide ions near the negative electrode. In this way, the aluminum of the collector in the negative electrode dissolves into the electrolyte solution.

Meanwhile, as shown in formula (4), hydrogen ions and aluminium oxide are produced in the presence of a slight amount of water and aluminum at the interface of the positive electrode and the electrolyte solution through charging to emit electrons. In addition, tetrafluoroborate anion dissolved in the solvent reacts with water molecules when attracted to the proximity of the positive electrode to produce fluorinated acid as shown in formulas (5), (6), and (7). Further, the fluorinated acid is considered to be present in the state of hydronium ion and fluorine ion as shown in formula (8).

Thus, electrons are transferred across the interface of the electrode and the electrolyte solution mainly by the reaction processes of formulas (1), (4), which are considered to increase/decrease electrons inside the electrodes and to gradually lower the voltage.

After aluminate ions are produced at the negative electrode, and hydrogen ions or hydronium ions and fluorine ions are produced at the positive electrode as described above, the following reaction is considered to further proceed.

At the negative electrode, hydrogen ions or hydronium ions attracted to the proximity of the negative electrode react with aluminate ions as shown in formula (3) to produce aluminum hydroxide and water. At the positive electrode, meanwhile, fluorine ions react with the aluminum of the collector as shown in formula (10) to produce aluminum fluoride. Between the positive and negative electrodes, aluminate ions produced at the negative electrode can react with fluorinated acid while the aluminate ions are moving to the positive electrode to produce aluminum fluoride.

On the basis of such supposition, the following three major phenomena are observed as a result that some conventional capacitors are disassembled and examined after undergoing various types of loads.

As the first phenomenon, deposit of aluminum hydroxide is observed at an exposed part in the cross section of the aluminum foil on the negative electrode. As the second, the presence of aluminum fluoride is observed at an exposed part of the aluminum foil on the positive electrode. As the third, the presence of aluminum fluoride is observed on the front and back surfaces of the separator at a part sandwiched between the end of the negative electrode and the electrode layer of the positive electrode. These phenomena are considered to support the supposition of the above-described reaction mechanism.

Particularly, portions where aluminum fluoride is produced, from which the reaction of formula (9) inferred, are located in a concentrated manner on the front and back surfaces of the separator at a part sandwiched between the end of the negative electrode and the electrode layer of the positive electrode. This is because aluminate ions produced particularly at an exposed cross section of the aluminum foil on the negative electrode move toward the positive electrode, which is considered to suggest that the origin from which aluminate ions are produced is the cross section of the aluminum foil. All of the above indicate that suppressing the processes of formulas (2), (4) can delay the reaction and suppress the self-discharge of the capacitor.

Under the circumstances, in the capacitor according to the embodiment, protectors 11A, 11B are formed on the cross sections of collectors 5A, 5B. This structure suppresses the reaction supposed to be intensively occurring on the cross sections of collectors 5A, 5B. Consequently, a self-discharge phenomenon is suppressed and a voltage drop is decreased after being left for a long term in an open state between leads 7, 8 after charging the capacitor.

Protectors 11A, 11B can be formed from any one of an electrically insulative metal compound, insulative resin, insulative carbon, and silicon.

When forming protectors 11A, 11B of an insulative metal compound, at least one of compounds formed of at least one selected from a group consisting of fluorine, oxygen, nitrogen, and carbon, and at least one selected from a group consisting of titanium, boron, and silicon, for example, can be used. To form these substances, the following method is used. That is, first, the cross sections of collectors 5A, 5B of the electrodes (positive electrode 2, negative electrode 3) are processed by argon sputtering in a decompression chamber to remove oxide on the surfaces. Next, at least one of titanium, boron, and silicon is heated in the decompression chamber. Then, high-voltage pulses are applied with an electrode inserted as a negative electrode to inject the above-described material into the metal exposed parts of collectors 5A, 5B with high energy. After that, at least one of material gases selected from fluorine, oxygen, nitrogen, hydrocarbon, silicon, fluorocarbon, and argon fluorohydride is injected into the decompression chamber. When silicon is injected into the metal exposed parts of collectors 5A, 5B with high energy, a material gas other than silicon is injected into the decompression chamber. Then, a voltage is applied with the electrode inserted as a negative electrode to ionize the gas injected in a plasma state. After that, further applying high-voltage pulses enables forming an insulative metal compound on the exposed metal parts of collectors 5A, 5B by the reaction with the material into which the above-described material is preliminarily injected into the exposed parts of collectors 5A, 5B. Here, when silicon is injected preliminary, the subsequent plasma treatment can be omitted to make silicon as protectors 11A, 11B.

When forming protectors 11A, 11B of an insulative resin, a resin layer stable against the electrolyte solution can be formed from one of the following resins or their composite lamination. Such resins include polyethylene (PE), polyethylene terephthalate (PET), polypropylene (PP), polyphenylene sulfide (PPS), tetrafluoroethylene-perfluoro alkyl vinyl ether copolymer (PFA), fluorinated ethylene-propylene copolymer (FEP), polyvinylidene fluoride (PVDF), ethylene-tetrafluoroethylene copolymer (ETFE), and polytetrafluoroethylene (PTFE). To form a PP layer, for example, a resin modified by replacing the end of PP with a hydroxyl group is dispersed into an organic solvent, and the dispersion liquid is applied to the cross sections of collectors 5A, 5B. After that, the liquid is heated to vaporize the organic solvent, thereby depositing resin particles. Thus, protectors 11A, 11B can be formed from an insulative resin.

Meanwhile, the following mixed material as an insulative resin may be applied to the cross sections of collectors 5A, 5B to form protectors 11A, 11B. The mixed material is prepared by mixing one of butyl rubber (IIR), ethylene-propylene rubber (EPT), and styrene-butadiene rubber (SBR) with one of an alicyclic petroleum resin, aliphatic petroleum resin, and terpene resin.

When forming protectors 11A, 11B of insulative carbon, fluorocarbon or hydrocarbon is injected into a decompression chamber with electrodes (positive electrode 2, negative electrode 3) preliminarily inserted thereinto. The fluorocarbon may be tetrafluoro methane or hexafluoroethylene, for example. The hydrocarbon may be methane, ethylene, acetylene, toluene, or benzene, for example.

Then, a voltage is applied with an electrode inserted as a negative electrode to ionize the gas injected in a plasma state. After that, further applying high-voltage pulses enables accumulating diamond-like carbon layers to form insulative carbon on the cross sections of collectors 5A, 5B. Further, the following aftertreatment may be performed. That is, at least one selected from fluorine, fluorocarbon, and argon fluorohydride is injected into the decompression chamber with electrodes preliminarily inserted thereinto. Then, a voltage is applied with the electrode inserted as a negative electrode to ionize the gas injected in a plasma state. After that, further applying high-voltage pulses replaces hydrogen of the diamond-like carbon with fluorine. Alternatively, diamond-like carbon is doped with fluorine to produce fluorinated diamond-like carbon. Such insulative carbon may be formed on the cross sections of collectors 5A, 5B.

In addition, a pretreatment may be performed to form diamond-like carbon stably. After ionizing argon gas in a plasma state first, applying high-voltage pulses removes a metal oxide film on the cross sections of collectors 5A, 5B. Then, after ionizing titanium and silicon in a plasma state, high-voltage pulses are applied to implant ions into the cross sections of collectors 5A, 5B. Next, after ionizing carbon in a plasma state, high-voltage pulses are applied to implant ions. Applying such a treatment allows forming titanium carbide and silicon carbide partially in the proximity of the cross sections of collectors 5A, 5B. Consequently, the binding degree between the diamond-like carbon and the cross sections of collectors 5A, 5B can be increased. As a result, protectors 11A, 11B made of diamond-like carbon free from easy exfoliation can be formed.

In some case, falls from electrode layers 6A, 6B accumulate on the cross sections of collectors 5A, 5B. For this reason, the falls are preferably removed before protectors 11A, 11B are formed. For this purpose, it is desirable that a gas is blown or an adhesive sheet is attached and detached.

In this embodiment, the description is made for a wound type of capacitor element 1 as an example. However, the present invention is not limited to the type. A laminated capacitor element can be used, where the same advantage is available as well.

Figure 4A:
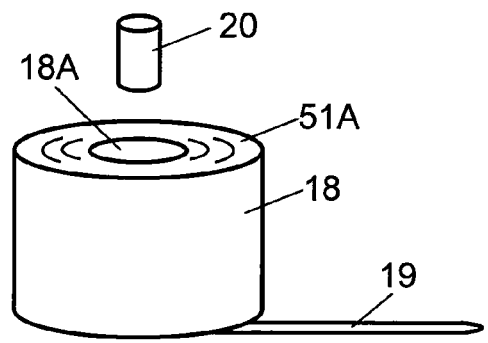
FIGS. 4A, 4B are perspective views showing methods of forming protectors in the capacitor element shown in FIG. 2.
Figure 4B:
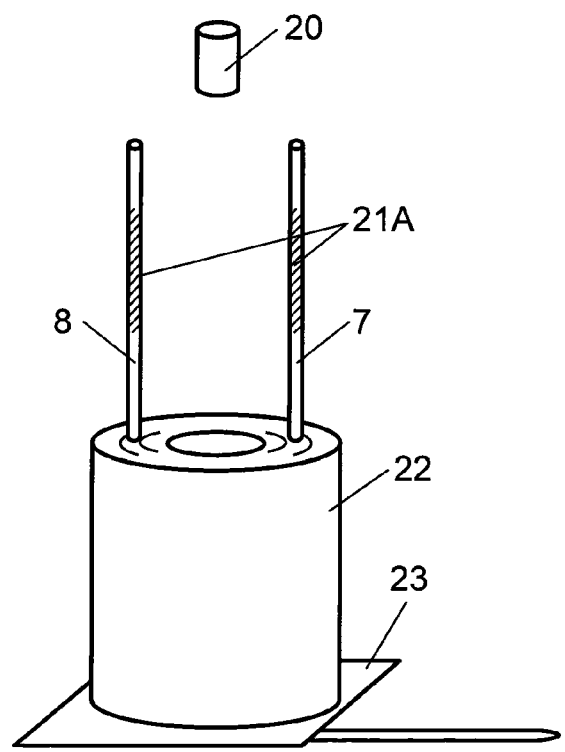

Next, a more concrete description is made for a method of forming protectors 11A, 11B made of an insulative metal compound, using FIGS. 4A, 4B.

First, as shown in FIG. 4A, electrode layer 6A is formed on collector 5A, and positive electrode 2 before lead 7 is connected thereto is wound to form wound body 18. Negative electrode 19 is connected to one end surface of wound body 18. Alternatively, negative electrode 19 is connected to winding core 18A of wound body 18. Then, wound body 18 is arranged in a decompression chamber (not shown) with positive electrode 20 placed around wound body 18. Then, the cross section of collector 5A is processed by argon sputtering in the decompression chamber to remove oxides on the surfaces. Next, at least one of titanium, boron, and silicon is heated in the decompression chamber. After that, at least one type of selected from the above-described material gases is injected into the decompression chamber. After a high-frequency voltage is applied between positive electrode 20 and negative electrode 19, high-voltage pulses are further applied. Thus, protector 11A can be formed on end surface 51A of collector 5A. Negative electrode 3 can be processed in the same way.

Alternatively, as shown in FIG. 4B, positive electrode 2 and negative electrode 3 with leads 7, 8 respectively connected thereto are wound with separator 4 placed therebetween to form element 22. Then, element 22 is arranged on negative electrode plate 23 made of metal, and positive electrode 20 is placed around element 22. That is, positive electrode 2 and negative electrode 3 are made electrically contact negative electrode plate 23. In this state, they are placed in a decompression chamber (not shown). Then, the cross sections of collectors 5A, 5B are processed by argon sputtering in the decompression chamber to remove oxides on the surfaces. Next, at least one of titanium, boron, and silicon is heated in the decompression chamber. After that, at least one of the above-described material gases is injected into the decompression chamber. After a high-frequency voltage is applied between positive electrode 20 and negative electrode plate 23, high-voltage pulses are further applied. Thus, protectors 11A, 11B can be formed on cross sections of collectors 5A, 5B. Here, outside projections 21A of leads 7, 8 are masked before forming protectors 11A, 11B and unmasked after the forming.

Instead of negative electrode plate 23, leads 7, 8 may be connected to negative electrode 19 shown in FIG. 4A to form protectors 11A, 11B.

The methods for producing a capacitor according to the embodiment facilitate forming protectors 11A, 11B on the cross sections of collectors 5A and 5B.

Protectors 11A, 11B are respectively placed in gaps formed between portions of separator 4 mutually facing, projecting on both end surfaces of capacitor element 1. Thus, relatively large protectors 11A, 11B allow increasing the mechanical strength of separator 4 against bending, thereby preventing a current from concentrating at a bent or broken part of separator 4.

Figure 5:
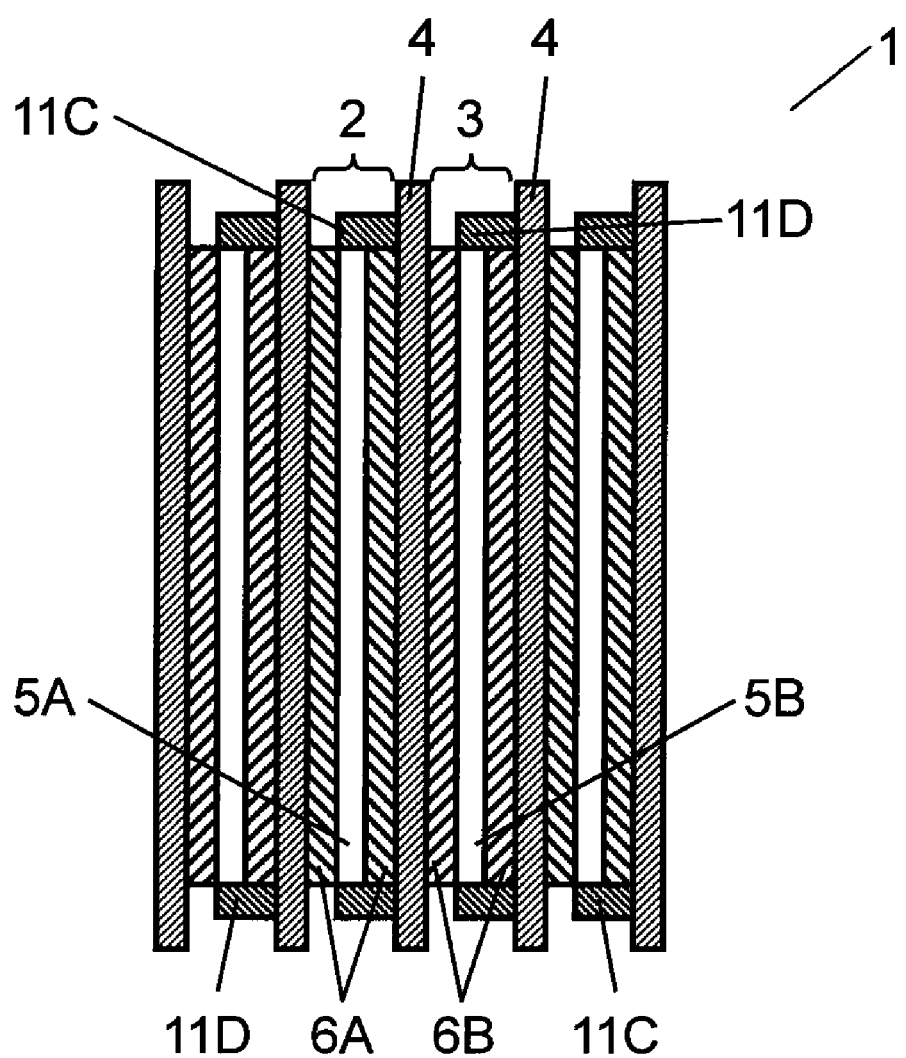
FIG. 5 is a sectional view of another capacitor element included in the electric double layer capacitor shown in FIG. 1.

Particularly, as shown in FIG. 5, protectors 11C, 11D are preferably formed so that they are partly bonded to either of the portions of separator 4 mutually facing. Such a structure is implemented by forming protectors 11C, 11D of an insulative resin. In a capacitor thus structured, the mechanical strength of separator 4 can be stabilized against bending.

SECOND EXEMPLARY EMBODIMENT

Figure 6:
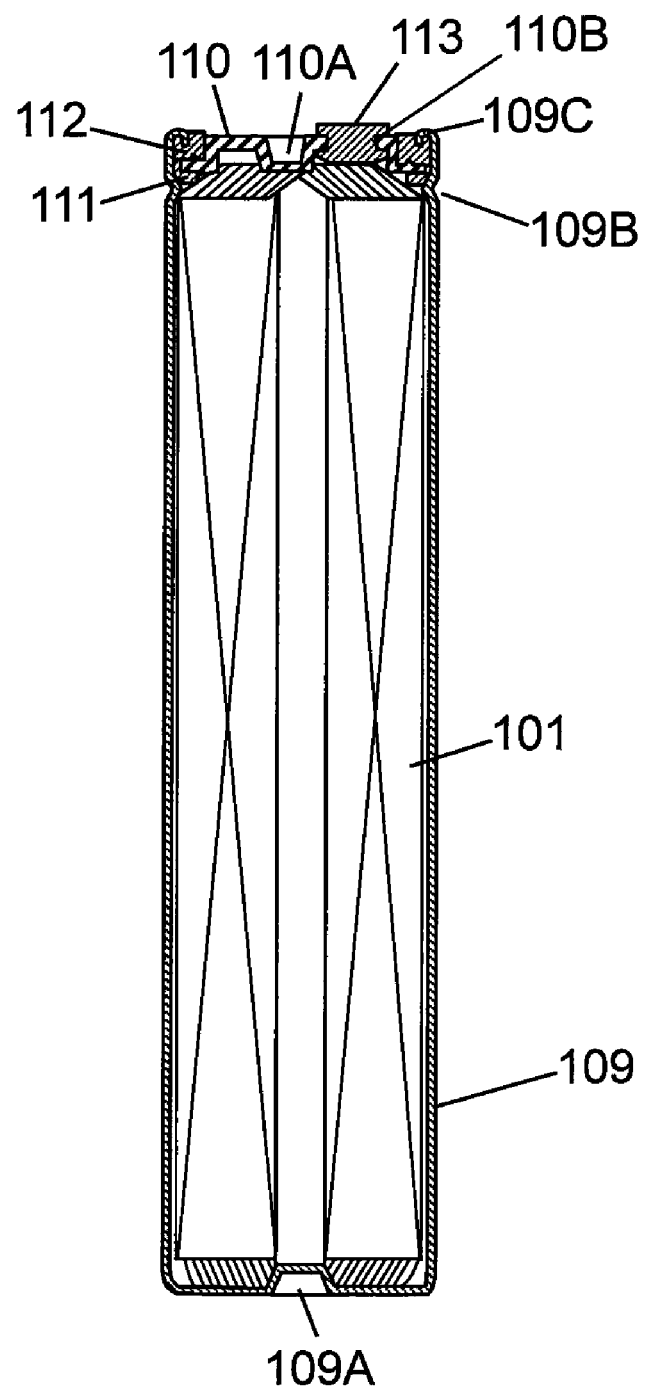
FIG. 6 is an outline sectional view showing the structure of an electric double layer capacitor as an example of capacitor according to a second exemplary embodiment of the present invention.
Figure 7:
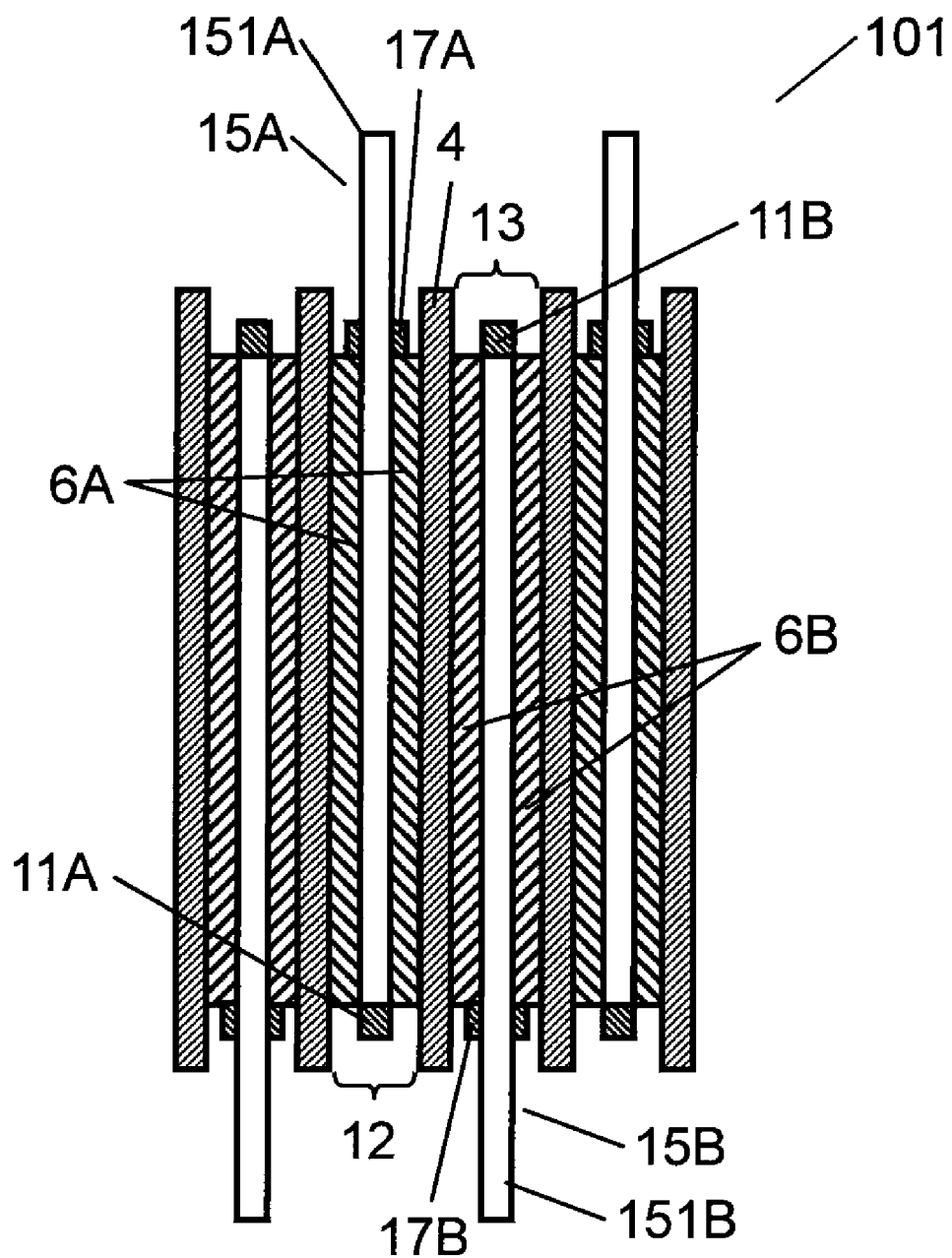
FIG. 7 is a sectional view of a capacitor element included in the electric double layer capacitor shown in FIG. 6.

FIG. 6 is an outline sectional view showing the structure of an electric double layer capacitor as an example of capacitor according to a second exemplary embodiment of the present invention. FIG. 7 is a sectional view of a capacitor element included in the electric double layer capacitor. The capacitor includes capacitor element 101, case 109, terminal plate 110, insulating member 111, sealing rubber 112, and hermetic sealer (hereinafter referred as "plug") 113.

Capacitor element 101 is formed of positive electrode 12 as a first electrode, negative electrode 13 as a second electrode, and separator 4. Positive electrode 12 includes collector (first collector) 15A made of aluminum foil and electrode layers 6A formed thereon. Negative electrode 13 as well includes collector (second collector) 15B made of aluminum foil and electrode layers 6B formed thereon. Then, positive electrode 12 and negative electrode 13 are disposed with their positions displaced from each other in the opposite directions, and are wound with separator 4 placed therebetween. Both top and bottom end surfaces of capacitor element 101 have collectors 15A, 15B projecting therefrom, respectively. That is, collectors 15A, 15B have exposed parts 151A, 151B exposed from separator 4 and projecting in the opposite directions, respectively.

Capacitor element 101 together with an electrolyte solution (not shown) is contained in case 109 made of metal such as aluminum. Case 109 is cylindrically shaped and has a bottom. The outer bottom surface of case 109 is provided therein with recess 109A. Collector 15B exposed at one end surface of capacitor element 101 is pressed to the inner surface where recess 109A is provided has, and is joined to the surface by laser welding (emitting laser light from the outer bottom surface of case 109) or other methods. The inner surface where recess 109A is provided is thus connected to negative electrode 13 of capacitor element 101 mechanically and electrically.

Terminal plate 110 blocks the opening of case 109. Terminal plate 110 is provided therein with recess 110A. Collector 15A exposed at the other end surface of capacitor element 101 is pressed to the bottom surface where recess 110A is provided, and is joined to the surface by laser welding (emitting laser light from the front surface of terminal plate 110) or other methods. The bottom surface at recess 110A is thus connected to positive electrode 12 of capacitor element 101 mechanically and electrically.

Ring-shaped insulating member 111 is placed at an upper part of the inner circumferential surface of drawn part 109B that is formed by drawing the proximity of the open end of case 109. Terminal plate 110 is placed on insulating member 111. Sealing rubber 112 is placed on the circumference of the top surface of terminal plate 110, and the open end of case 109 is curled to form curled part 109C, thereby compressing sealing rubber 112 to insulate and to seal between case 109 and terminal plate 110.

After the electrolyte solution is injected into case 109 through hole 110B for electrolyte injection provided in terminal plate 110, plug 113 is press-fit so as to block hole 110B. Plug 113 is made of a rubber-like elastic body such as butyl rubber (IIR) or ethylene-propylene terpolymer (EPT).

An insulating tape (not shown) is placed on positive electrode 12 and its proximity, thereby preventing a short circuit between the inner circumferential surface of case 109 and positive electrode 12. Here, the insulating tape can be dispensed with by applying a relevant part of the inner circumferential surface of case 109 with insulating coating.

Protectors 11A, 11B are formed on the cross sections of collectors 15A, 15B of positive electrode 12 and negative electrode 13, respectively in the same way as in the first embodiment, thereby bringing about the same effects as in the first embodiment.

In this structure, leads can be extracted from both end surfaces of capacitor element 101 to positive electrode 12 and negative electrode 13, respectively, thereby dispensing with leads and reducing the connection resistance.

In addition, it is preferable that positive electrode 12 further has protector 17A on a part of exposed part 151A, and negative electrode 13 further has protector 17B on a part of exposed part 151B. Concretely, it is preferable that protector 17A is placed at or in vicinity of the boundary between electrode layer 6A and exposed part 151A, and that protector 17B is placed at or in vicinity of the boundary between electrode layer 6B and exposed part 151B. The part of exposed part 151A at or in vicinity of the boundary between exposed part 151A and electrode layer 6A is positioned where negative electrode 13 is close to collector 15A. Similarly, the part of exposed part 151B at or in vicinity of the boundary between exposed part 151B and electrode layer 6B is positioned where positive electrode 12 is close to collector 15B. Consequently, the reaction same as that on the cross sections of collectors 15A, 15B is assumed to be likely to occur. For this reason, these positions as well are preferably provided with protectors 17A, 17B. Protectors 17A, 17B can be formed from a material same as that for protectors 11A, 11B.

In this embodiment, the description is made for a wound type as an example of capacitor element 101. However, the present invention is not limited to the type, but a laminated capacitor element can be used, where the same advantage is available as well.

Figure 8:
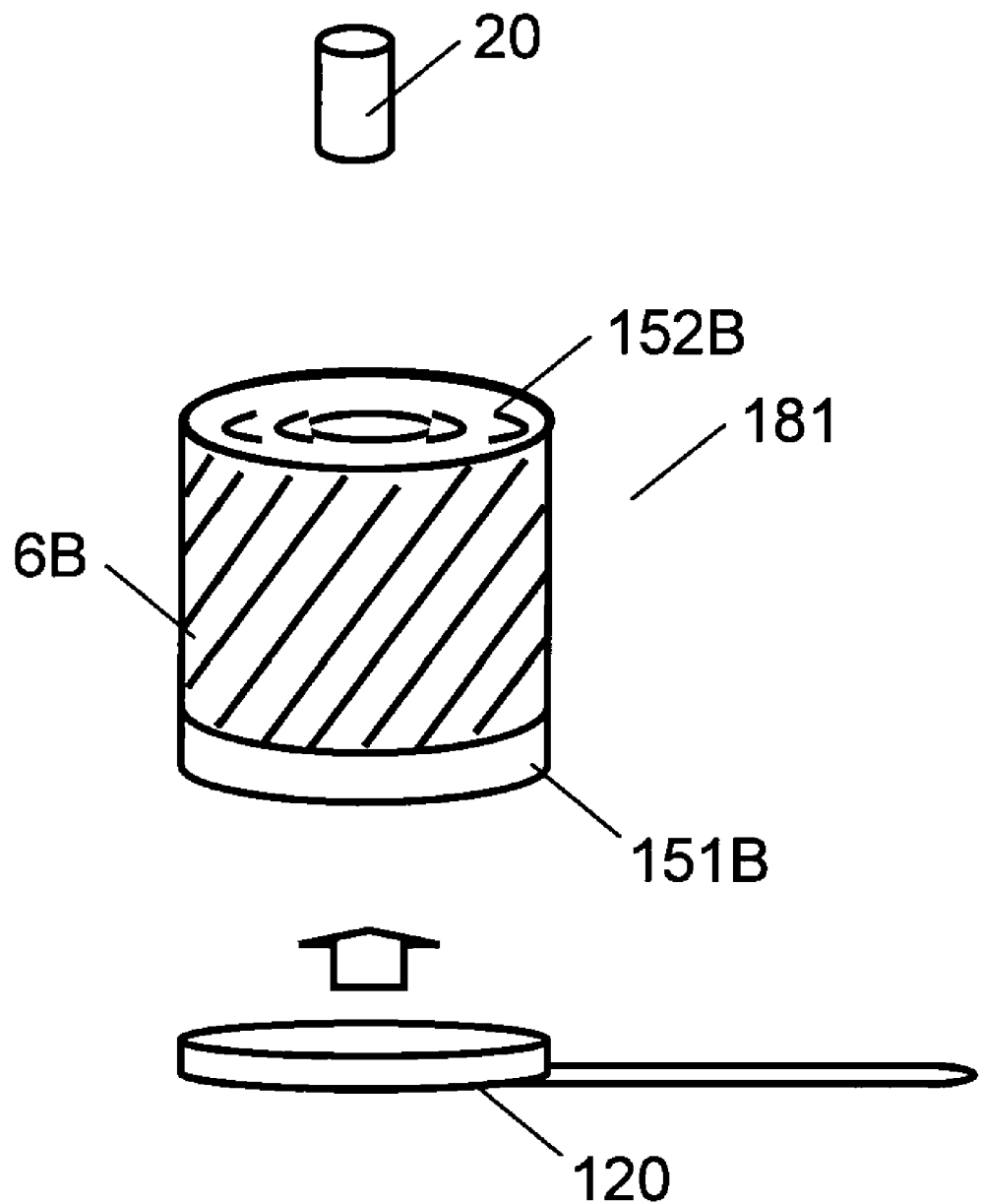
FIG. 8 is a perspective view showing a method of forming a protector in the capacitor element shown in FIG. 7.

Next, a more concrete description is made for a method of forming protectors 11A, 11B, 17A, 17B made of an insulative metal compound, using FIG. 8.

First, as shown in FIG. 8, negative electrode 13 is wound to form wound body 181. Then, the lower part of exposed part 151B is covered with mask 120. Mask 120 made of metal is cylindrically shaped and has a bottom. Then, they are arranged in a decompression chamber (not shown) with positive electrode 20 placed around wound body 181. Then, the section of collectors 15B and the upper part of exposed part 151B are processed by argon sputtering in the decompression chamber to remove oxides on the surfaces. Next, at least one of titanium, boron, and silicon is heated in the decompression chamber. After that, at least one of the material gases described in the first embodiment is injected into the decompression chamber. After a high-frequency voltage is applied between positive electrode 20 and mask 120, high-voltage pulses are further applied. Thus, protectors 11B, 17B can be formed on section 152B of collector 15B and on a part of exposed part 151B, excluding its end surface and outer circumferential surface, respectively. This method enables forming protectors 11B, 17B at a required position and dispenses with providing an insulator at the position to be connected to case 109. Positive electrode 12 can be processed in the same way.

Figure 9:
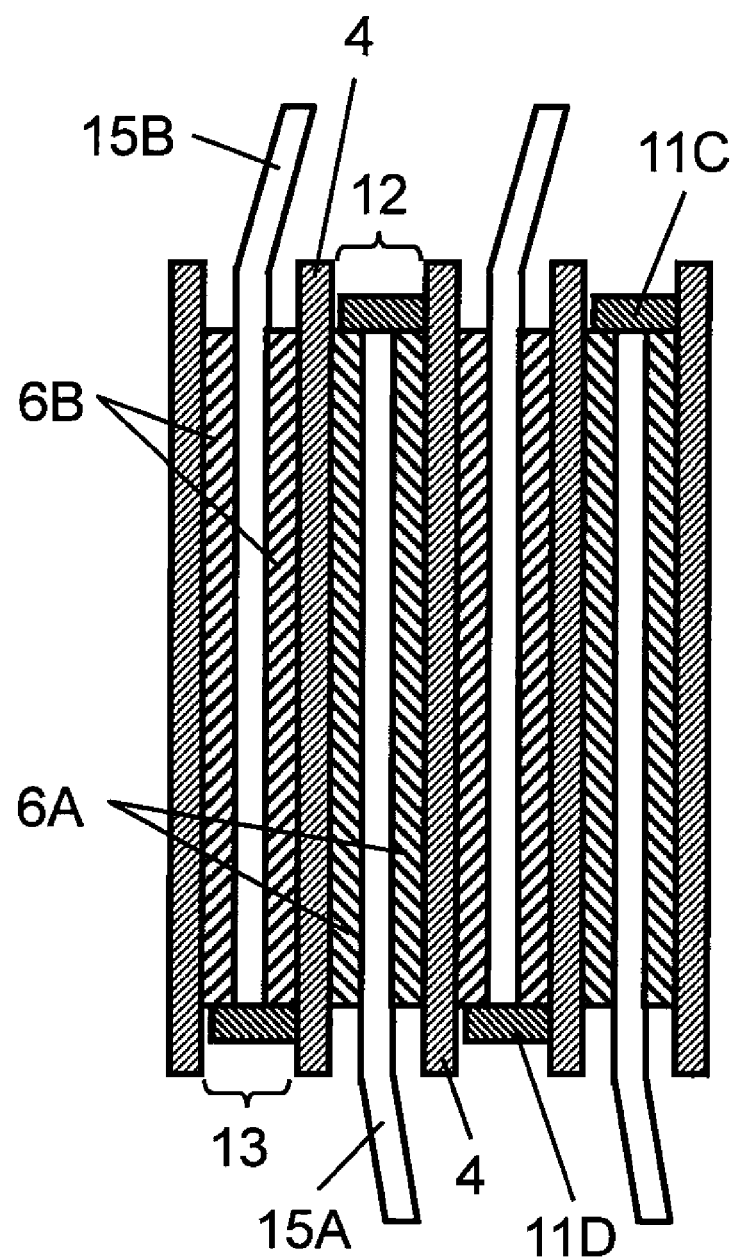
FIG. 9 is a sectional view of another capacitor element included in the electric double layer capacitor shown in FIG. 6.

Here, as shown in FIG. 9, protectors 11C, 11D may be formed so as to bond to either of sides of separator 4 mutually facing. The structure stabilizes the mechanical strength of separator 4 against bending.

THIRD EXEMPLARY EMBODIMENT

Figure 10:
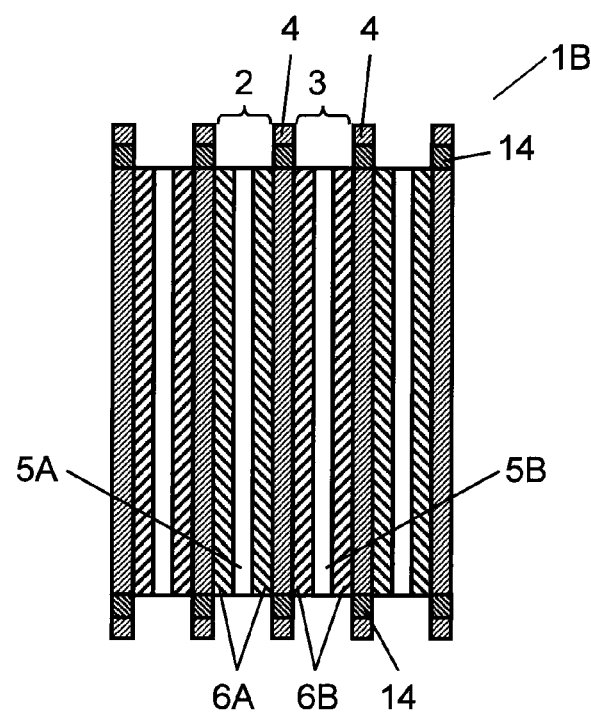
FIG. 10 is a sectional view of a capacitor element included in an electric double layer capacitor as an example of capacitor according to a third exemplary embodiment of the present invention.

FIG. 10 is a sectional view of a capacitor element included in an electric double layer capacitor as an example of capacitor according to a third embodiment of the present invention. Capacitor element 1 of the first embodiment has protectors 11A, 11B provided on the cross sections of collectors 5A, 5B. On the other hand, capacitor element 1B of the present embodiment does not have protectors 11A, 11B, but resin-filled part 14 is formed. Resin-filled parts 14 are made by filling parts of separator 4 with an insulative resin.

As described in the first embodiment using FIG. 3, when the electrolyte solution contains a slight amount of moisture, aluminate ions are produced at the negative electrode, and aluminium oxide and aluminum fluoride are produced at the positive electrode by charging. The moisture starting this reaction is assumed to be produced also from carboxymethylcellulose as a binder material contained in the electrode layer also containing carbon. Hereinafter, a detailed description is made for the dehydration reaction of carboxymethylcellulose.

First, by the action of acid on carboxylic acid and alcohol, ester and water are produced. Formula (11) represents such Fischer esterification.

In formula (11), the reaction process is described step by step in the order from (1) to (6) (from the first step to the sixth step). The first step represents the catalysis of acid, where protonation occurs in the carbonyl groups of the carboxylic acid. The protonation increases the positive charge on the carbon atom of the carboxyl groups, and thus nucleophilic attack on the carbon atom is likely to occur.

The second step represents a reaction in which alcohol performs nucleophilic attack on the protonated acid, where new carbon-oxygen binding (ester binding) is formed. Then, the step passes through the generating process of ortho acid hemiester as a reaction intermediate.

The third and fourth steps represent an equilibrium reaction in which protons are added to or released from three oxygen atoms. This equilibrium reaction is reversible and occurs extremely rapidly, always occurring in an acid solution of a compound containing an oxygen atom. In the fourth step, the two hydroxy groups are equivalent and whichever group may be protonated.

In the fifth step, the carbon-oxygen binding is cleaved and a water molecule is released. This step exactly corresponds to the reverse reaction of the second step. In order for this reaction to occur, hydroxy groups need to be protonated to increase the leaving ability preliminarily. In the sixth step, a proton is released from the protonated ester.

The series of reactions are a dehydration condensation reaction classified as an addition-elimination reaction. All the processes of this Fischer esterification are reversible reactions, where hydrolysis as a reverse reaction is concurrently present. For example, when water produced during the reaction process is removed outside the reaction system, the reaction proceeds to the right. In the reaction process shown in FIG. 3, the reaction of formula (11) is expected to proceed due to water consumption by charging the capacitor.

The binder for the electrode layer is mainly such as carboxymethylcellulose ammonium shown in formula (12). Carboxymethylcellulose ammonium includes parts where ammonium is substituted for a hydrogen atom of the carboxyl groups in the molecules, and hydroxy groups. With the action of the acid produced in the reaction process shown in FIG. 3, there is a possibility of Fischer esterification shown in formula (13) occurring.

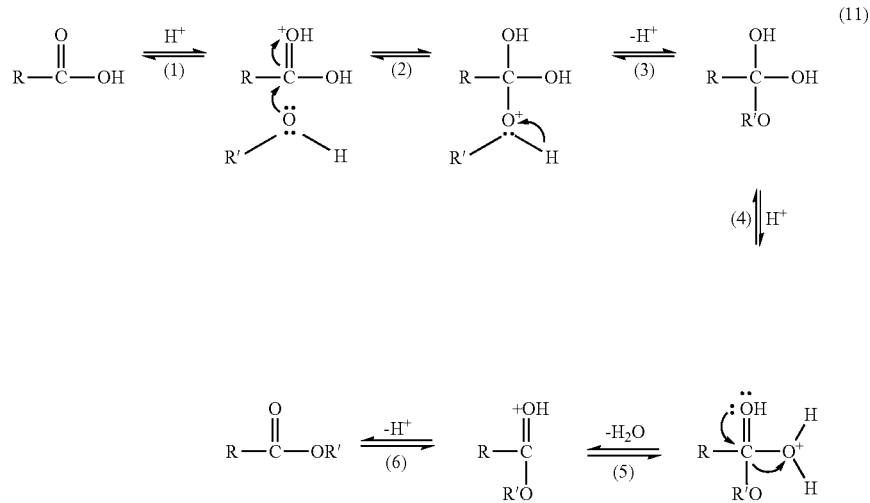

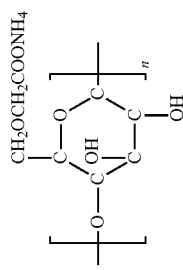
(12)
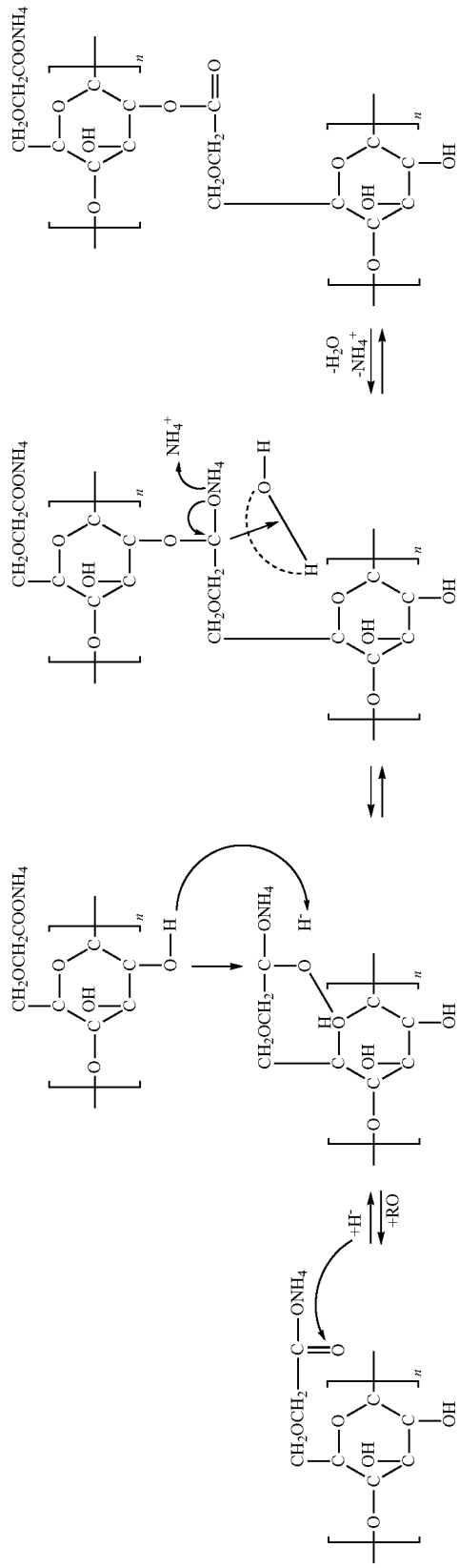
(13)

A detailed description is made for the dehydration reaction of the separator (cellulose), using formula (14). As a dehydration reaction proceeding as a result that a water molecule is released from the molecule, intramolecular dehydration is known. For example, adding concentrated sulfuric acid as a dehydrating agent to ethanol and heating the mixture to a temperature between 160° C. and 180° C. cause water to be released, producing ethylene with double bonds. Any hydrogen atom on a carbon atom adjacent to another carbon atom attached to a hydroxy group can be released in principle. Two different types of alkenes are produced from 2-methyl-2-butanol, for example.

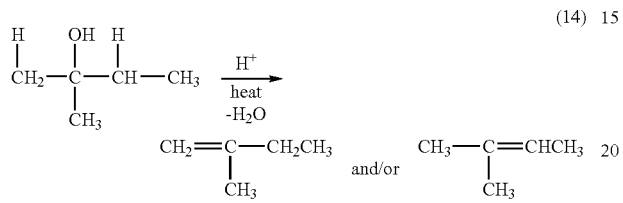

(14)

Here, a dehydration reaction is likely to occur in the order of tertiary, secondary, and primary alcohol. The separator composing the capacitor element is mainly such as the cellulose shown in formula (15). In the cellulose, its hydroxy group is protonated and dehydrated as shown in formula (16) by the action of acid produced in the reaction process shown in FIG. 3, possibly causing double bonds to occur in the molecule.

With the above-described mechanism, water can be produced with a high possibility as a result that acid acts on cellulosic materials and others included in the capacitor element.

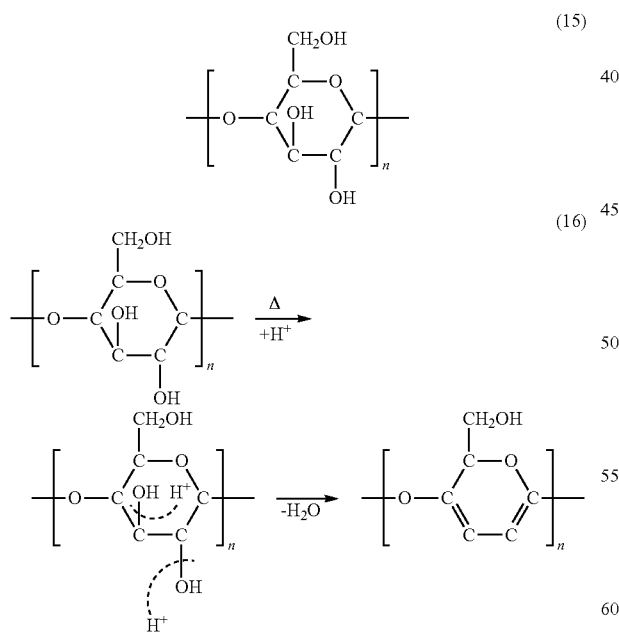

In this embodiment, separator 4 is provided with resin-filled parts 14 at the parts contacting the ends of positive electrode 2 and negative electrode 3. That is, the gaps at the parts contacting the ends of positive electrode 2 and negative electrode 3 are filled with an insulative resin.

In a capacitor according to the present embodiment, the surface of the cellulose fiber composing separator 4 is covered with the insulative resin at parts where the reaction shown in FIG. 3 occurs. This structure suppresses the reaction (dehydration reaction) between separator 4 and the electrolyte solution, and accordingly a self-discharge phenomenon.

Here, as the insulative resin composing resin-filled part 14, any one of PE, PET, PP, PPS, PFA, FEP, PVDF, ETFE, and PTFE, for example, or a compound material of these can be used.

These resins are all stable against an electrolyte solution. To fill with PP, for example, the following method is used. That is, a resin modified by replacing the end of PP with a hydroxyl group is dispersed into an organic solvent, and the dispersion liquid is applied to the parts of the surface of separator 4 contacting the ends of positive electrode 2 and negative electrode 3. After that, the liquid is heated to vaporize the organic solvent, thereby depositing the resin particles. In this way, voids near the surface in separator 4 can be filled with the resin. Here, another method may be used. That is, an organic solvent with high-boiling point is used to prepare dispersion liquid and the liquid is applied on the surface of separator 4, and separator 4 is left in a vacuum or reduced-pressure atmosphere after the dispersion liquid is applied to the surface of separator 4. In this method, PP together with the solvent can be permeated into the voids of separator 4, thus causing the voids of separator 4 to be filled with PP in a higher density.

Here, instead of providing resin-filled part 14, fluorine may be substituted for the hydroxyl groups of the cellulose composing separator 4 as shown in formula (17).

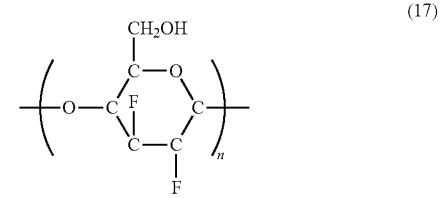

(17)

Cellulose can be fluorinated by the following method, for example. First, separator 4 is arranged between positive and negative electrodes disposed in a decompression chamber. Then, at least one of fluorine, fluorocarbon, and argon fluorohydride is injected into the decompression chamber, and a high-frequency voltage is applied between the positive and negative electrodes. After ionizing the gas thus injected in a plasma state, high-voltage pulses are further applied between the electrodes, thereby substituting the hydroxyl groups of separator 4 for fluorine.

In a capacitor according to this embodiment thus structured, the reaction (dehydration reaction) between separator 4 and the electrolyte solution is suppressed in the same way as described above, and thus a self-discharge phenomenon is suppressed.

Instead of providing resin-filled part 14, polysaccharides produced by partially substituting fluorine for hydroxyl groups as shown in formula (18) may be used as a binder of electrode layers 6A, 6B.

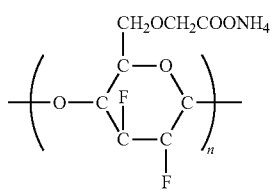

(18)

When electrode layers 6A, 6B contain a polysaccharide as binder, the polysaccharide can be fluorinated in the following way. First, positive and negative electrodes are disposed in a decompression chamber, and at least one of fluorine, fluorocarbon, and argon fluorohydride is injected into the decompression chamber with the negative electrode being connected to collectors 5A and 5B. After ionizing the gas injected in a plasma state by applying a high-frequency voltage between the positive and negative electrodes, high-voltage pulses are further applied between the electrodes, thereby substituting the hydroxyl groups of the polysaccharide for fluorine.

In a capacitor according to this embodiment thus structured, the reaction (dehydration reaction, esterification) between the polysaccharide and the electrolyte solution is suppressed, and thus a self-discharge phenomenon is suppressed.

Instead of providing resin-filled part 14, it is allowable that electrode layer 6A of positive electrode 2 doesn't contain polysaccharide but latex.

In a capacitor according to this embodiment thus structured, the reaction (dehydration reaction, esterification) between the polysaccharide in positive electrode 2 and the electrolyte solution is suppressed, and thus a self-discharge phenomenon is suppressed.

Instead of providing resin-filled part 14, separator 4 may be acid-treated preliminarily. More specifically, separator 4 is preliminarily immersed in a heated acid solution before producing a capacitor element, thereby causing a dehydration reaction shown in formula (16) to occur. The process reduces functional groups accompanying this reaction. After that, separator 4 is rinsed in water to remove the acid. Such process suppresses a dehydration reaction while the capacitor is being used, resulting in a self-discharge phenomenon suppressed.

Figure 11:
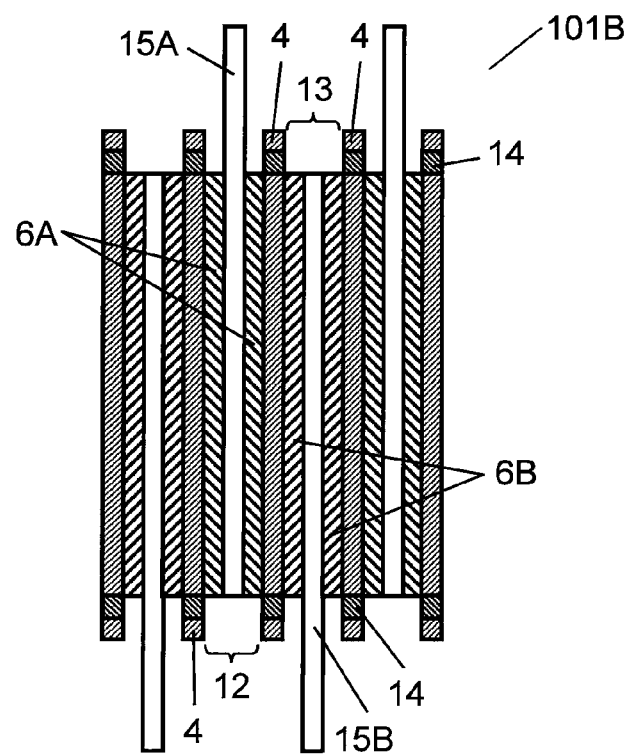
FIG. 11 is a sectional view of a capacitor element included in another electric double layer capacitor as an example of capacitor according to the third exemplary embodiment of the present invention.

Here, as shown in FIG. 11, when positive electrode 12 and negative electrode 13 same as those in the second embodiment are employed, the positions of separator 4, facing the ends of electrode layers 6A, 6B, may have resin-filled parts 14 formed therein. When inserting capacitor element 101B into case 109 shown in FIG. 6, separator 4 projecting on both end surfaces of capacitor element 101B bends in some cases. In such a case, current crowding occurs at a bent or broken part of separator 4, thereby accelerating the above-described reaction.

However, forming resin-filled parts 14 on the positions of separator 4, facing the ends of electrode layers 6A, 6B, suppresses bending of separator 4, and as a result, the above-described reaction is not accelerated.

Figure 12A:
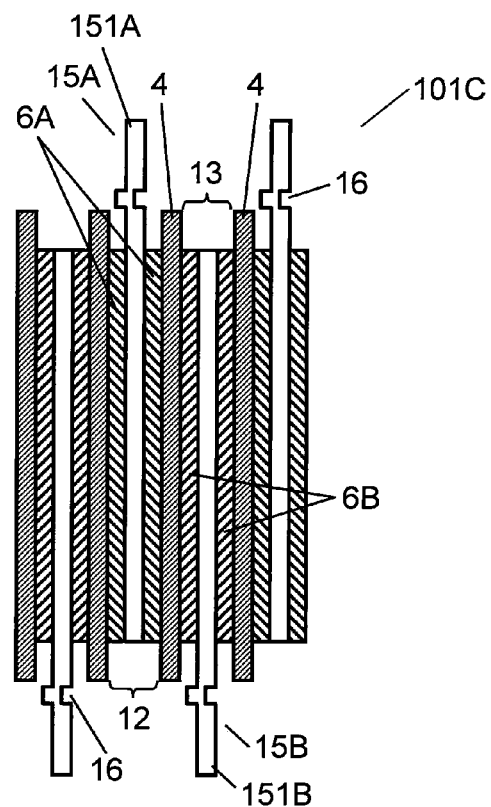
FIGS. 12A, 12B are sectional views of yet another capacitor element included in an electric double layer capacitor as an example of capacitor according to the third exemplary embodiment of the present invention.

In addition, as shown in FIG. 12A, exposed parts 151A, 151B of collectors 15A, 15B are preferably provided therein with strip-shaped recesses 16. Recess 16 is placed outside the end of separator 4 and in parallel with the end surface of separator 4. Here, recess 16 may be in a discontinuous strip shape (i.e. broken line, chain line) besides a continuous strip shape.

When inserting capacitor element 101C into case 109 shown in FIG. 6, separator 4 projecting on both end surfaces of capacitor element 101C and collectors 15A, 15B can bend. In some cases, collectors 15A, 15B bend to cause electrode layers 6A, 6B to break into separator 4, possibly breaking separator 4. In these cases, current crowding occurs at a bent or broken part of separator 4, thereby further accelerating the above-described reaction.

Figure 12B:
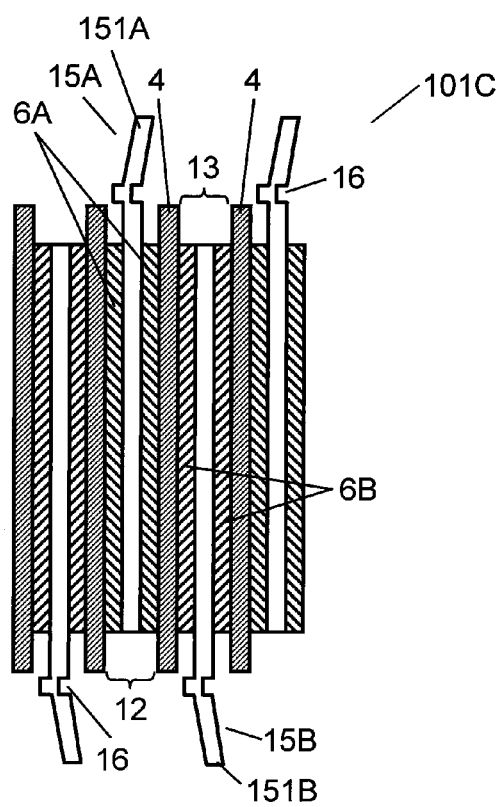
Figure 13:
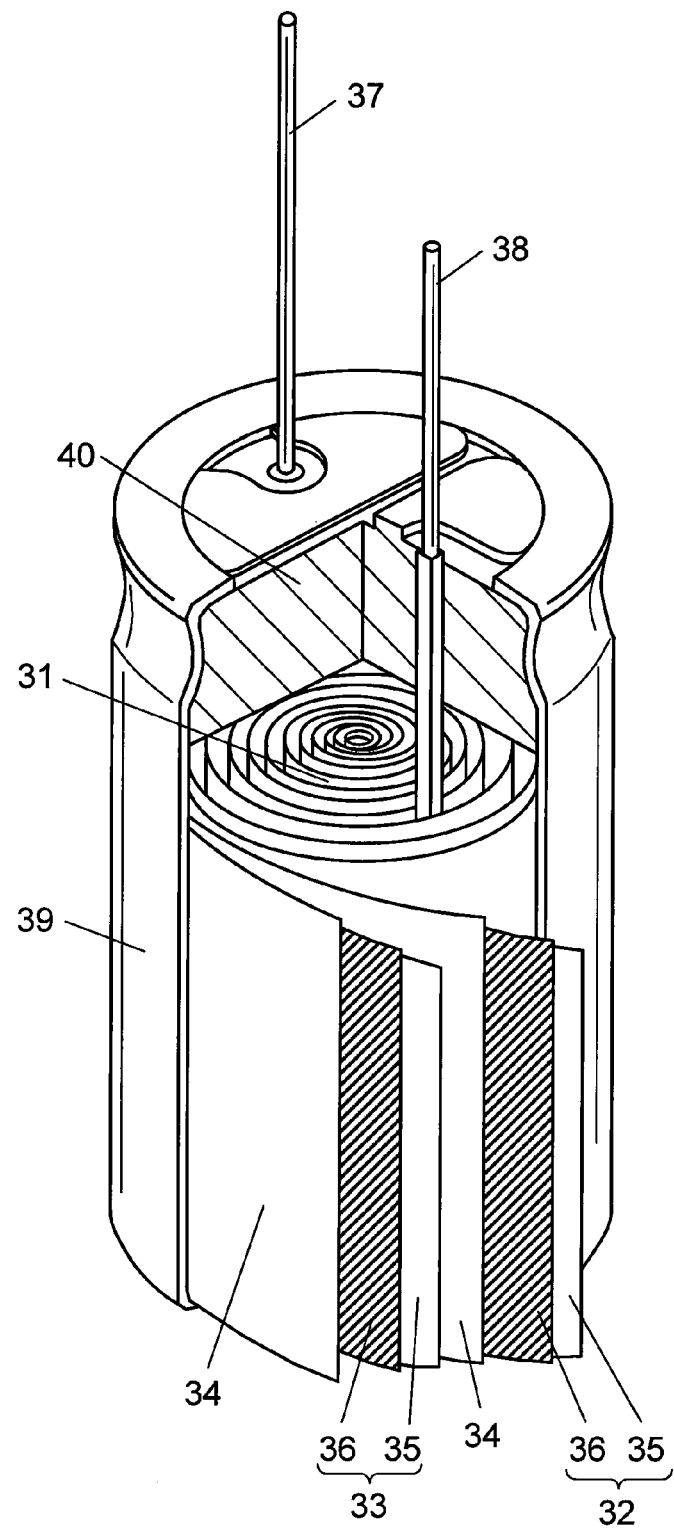
FIG. 13 is a partial cutaway perspective view illustrating the structure of an electric double layer capacitor as an example of a conventional capacitor.
Figure 14:
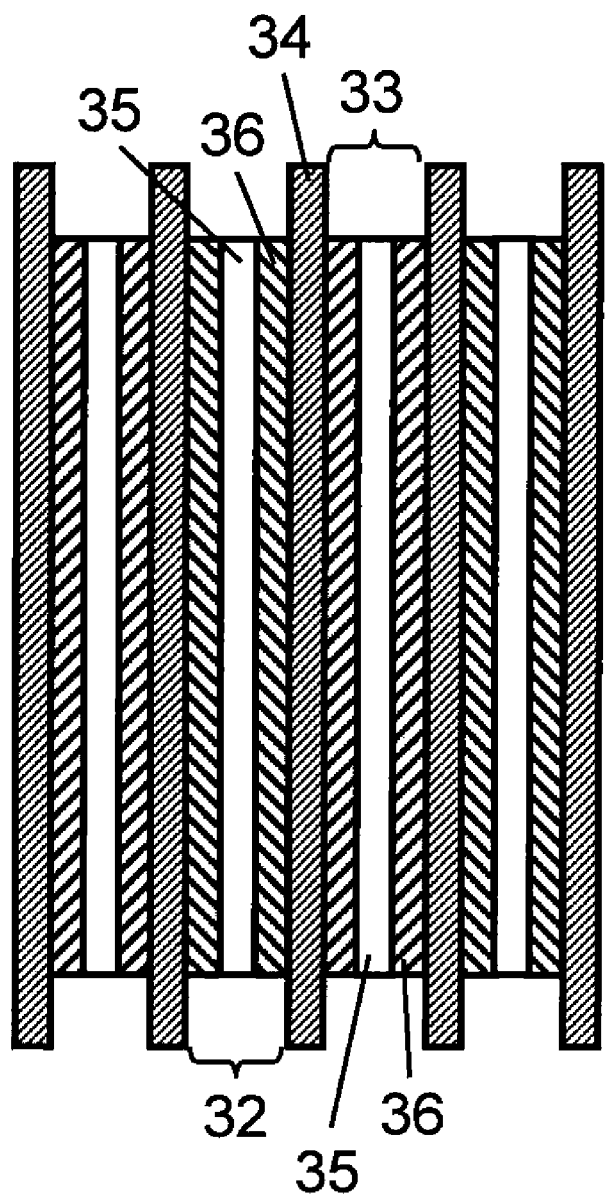
FIG. 14 is a sectional view of a capacitor element included in the electric double layer capacitor shown in FIG. 13.

However, in the structure of FIG. 12A, exposed parts 151A, 151B are provided therein with strip-shaped recesses 16. For this reason, collectors 15A, 15B bend with recesses 16 being origins as shown in FIG. 12B. Consequently, exerting of an excessive stress on collectors 15A, 15B is suppressed. This suppresses the acceleration of the above-described reaction, resulting in a self-discharge phenomenon suppressed.

Meanwhile, each structure described in the third embodiment can be applied in combination with those described in the first and second embodiments.

For collectors 5A, 5B, 15A, 15B, not only aluminum but a metal with a low specific resistance such as copper or stainless steel can be used. Even in such a case, the structures in the first through third embodiments are effective when an electrolyte producing corrosive ions is used. Such electrolytes include a salt containing $PF_6^-$ ions.

As described above, in a capacitor according to the present invention, a self-discharge phenomenon is suppressed. That is, this capacitor represents a slight voltage drop even if the external terminals are left open for a long term after charging, thus maintaining a voltage higher than that in a conventional one. Consequently, the present invention is useful particularly in a field such as for staring an engine of a vehicle.

What is claimed is:

1. A capacitor comprising:
a first electrode including a first collector made of metal foil, a first electrode layer containing carbon formed on a surface of the first collector, and a first protector covering a cross section of the first collector;
a separator;
a second electrode including a second collector made of metal foil, a second electrode layer containing carbon formed on a surface of the second collector, and a second protector covering a cross section of the second collector, the second electrode facing the first electrode with the separator placed between the first electrode and the second electrode; and
an electrolyte solution placed between the first electrode and the second electrode,
wherein the first and second protectors are placed in gaps formed between portions of the separator.

2. The capacitor according to claim 1, wherein the first protector and the second protector are formed of one of an insulative metal compound, insulative resin, insulative carbon, and silicon.

3. The capacitor according to claim 2, wherein the insulative metal compound is a compound of at least one of fluorine, oxygen, nitrogen, and carbon; with at least one of titanium, boron, and silicon.

4. The capacitor according to claim 2, wherein the insulative resin is made of at least one of polyethylene, polyethylene terephthalate, polypropylene, polyphenylene sulfide, tetrafluoroethylene-perfluoro alkyl vinyl ether copolymer, fluorinated ethylene-propylene copolymer, polyvinylidene fluoride, ethylene-tetrafluoroethylene copolymer, and polytetrafluoroethylene.

5. The capacitor according to claim 2, wherein the insulative resin is a mixed material of one of butyl rubber, ethylene-propylene rubber, and styrene-butadiene rubber; with one of an alicyclic petroleum resin, aliphatic petroleum resin, and terpene resin.

6. The capacitor according to claim 2, wherein the insulative carbon is one of diamond-like carbon and fluorinated diamond-like carbon.

7. The capacitor according to claim 1,
wherein the first collector includes a first exposed part exposed from the separator, the second collector includes a second exposed part exposed from the separator, and the second exposed part projects in a direction opposite to the first exposed part.

8. The capacitor according to claim 7,
wherein the first electrode further includes a third protector at a part of the first exposed part, and the second electrode further includes a fourth protector at a part of the second exposed part.

9. The capacitor according to claim 8,
wherein the third protector is placed at a first boundary between the first electrode layer and the first exposed part or in vicinity of the first boundary; and
wherein the fourth protector is placed at a second boundary between the second electrode layer and the second exposed part or in vicinity of the second boundary.

10. The capacitor according to claim 8, wherein the third protector and the fourth protector are formed of one of an insulative metal compound, insulative resin, insulative carbon, and silicon.

11. The capacitor according to claim 10, wherein the insulative metal compound is a compound of at least one of fluorine, oxygen, nitrogen, and carbon; with at least one of titanium, boron, and silicon.

12. The capacitor according to claim 10, wherein the insulative resin is made of at least one of polyethylene, polyethylene terephthalate, polypropylene, polyphenylene sulfide, tetrafluoroethylene-perfluoro alkyl vinyl ether copolymer, fluorinated ethylene-propylene copolymer, polyvinylidene fluoride, ethylene-tetrafluoroethylene copolymer, and polytetrafluoroethylene.

13. The capacitor according to claim 10, wherein the insulative resin is a mixed material of one of butyl rubber, ethylene-propylene rubber, and styrene-butadiene rubber; with one of an alicyclic petroleum resin, aliphatic petroleum resin, and terpene resin.

14. The capacitor according to claim 10, wherein the insulative carbon is one of diamond-like carbon and fluorinated diamond-like carbon.

15. The capacitor according to claim 1, wherein the first electrode, the second electrode, and the separator are wound, and the separator projects from the first electrode layer and the second electrode layer in a direction orthogonal to a wound direction of the first electrode and the second electrode.

16. The capacitor according to claim 15, wherein the first protector and the second protector are joined to the separator.

* * * * *